(12) United States Patent
Dhanekula et al.

(10) Patent No.: US 7,912,685 B1
(45) Date of Patent: Mar. 22, 2011

(54) MITIGATING QUANTIZATION EFFECTS IN COMPUTER TELEMETRY SIGNALS

(75) Inventors: Ramakrishna C. Dhanekula, San Diego, CA (US); Kenny C. Gross, San Diego, CA (US); Keith A. Whisnant, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1095 days.

(21) Appl. No.: 11/656,736

(22) Filed: Jan. 22, 2007

(51) Int. Cl.
*G06G 7/48* (2006.01)
(52) U.S. Cl. .............................. 703/7; 700/29
(58) Field of Classification Search .............. 703/13, 703/7
See application file for complete search history.

(56) References Cited

U.S. PATENT DOCUMENTS

| | | | |
|---|---|---|---|
| 6,898,469 B2 * | 5/2005 | Bickford | 700/30 |
| 6,917,839 B2 * | 7/2005 | Bickford | 700/30 |
| 6,917,845 B2 * | 7/2005 | Hsiung et al. | 700/104 |

OTHER PUBLICATIONS

Usynin et al, "A Method for Enabling Proactive Fault Monitoring in High-End Computer Servers", Advances in Computer, Information, and Systems Sciences, and Engineering 1-4, 2006.*
Goebel et al, "Fusing Diverse Monitoring Algorithms for Robust Change Detection", Proceedings of SPIE, Multisensor, Multisource Information Fusion, Architectures, Algorithms, and Applications, vol. 6242, pp. 192-202, Apr. 18, 2006.*
Fraser et al, "Neural Network Modelling and Prediction in Multipass Steel Processing", Proceedings, Institution Mechanical Engineers, vol. 218, Part E: J. Process Mechanical Engineering, 2004.*
Gribok et al, "Use of Kernel Based Techniques for Sensor Validation in Nuclear Power Plants", International Topical Meeting on Nuclear Plant Instrumentation, Controls and Human-Machine Interface Technologies, Washington, DC, Nov. 2000.*
Wegerich et al, "Challenges Facing Equipment Condition Monitoring Systems", In Proc. Maintenance and Reliability Conference, Gatlinburg, TN, 2001.*
Gross et al, "Application of Model-Based Fault Detection System to Nuclear Power Plant Signals", 9th International Conference on Intelligent Systems Applications to Power Systems, Seoul, Korea, Jul. 6-10, 1997.*

\* cited by examiner

*Primary Examiner* — Mary C Jacob
(74) *Attorney, Agent, or Firm* — Park, Vaughan, Fleming & Dowler LLP

(57) ABSTRACT

A system that mitigates quantization effects in quantized telemetry signals. During operation, the system monitors a set of quantized telemetry signals. For a given quantized telemetry signal in the set of quantized telemetry signals, the system uses a set of models to generate a set of estimates for the given quantized telemetry signal from the other monitored quantized telemetry signals, wherein each model in the set of models was initialized using a different randomly selected subset of a training dataset. The system then averages the set of estimates to produce an estimated signal for the given quantized telemetry signal.

21 Claims, 3 Drawing Sheets

MITIGATING QUANTIZATION EFFECTS IN COMPUTER TELEMETRY SIGNALS

BACKGROUND

1. Field of the Invention

The present invention relates to techniques for proactively detecting impending problems in computer systems. More specifically, the present invention relates to a method and apparatus for mitigating quantization effects in telemetry signals while using the telemetry signals to detect impending problems in a computer system.

2. Related Art

Continuous system telemetry is being increasingly used for real-time proactive health monitoring of servers, networks, and peripherals. Continuous system telemetry is typically used in conjunction with pattern recognition techniques to identify patterns in telemetry signals that can indicate whether a computer system is at the onset of degradation. In some computer systems, low-resolution analog-to-digital chips (e.g., 8-bit A/D chips) are used to convert analog telemetry signals into digital telemetry signals. Low-resolution A/D chips can generate digitized telemetry signals that are severely quantized. Hence, values for the quantized telemetry signals are reported in only a few "quantization levels." Unfortunately, pattern recognition techniques cannot be applied to low-resolution quantized telemetry signals.

One solution to this problem is to use higher-resolution A/D chips. For example, a 12-bit A/D chip provides 16 times more quantization levels than an 8-bit A/D chip. Unfortunately, such higher-resolution A/D chips are expensive, and retrofitting legacy systems that contain low-resolution A/D chips with higher-resolution A/D chips is impractical.

Other solutions involve preprocessing raw telemetry signals to infer the true mean values of the signals. For example, a moving histogram technique or a spectral synthesis technique can be used to mitigate the effects of quantization in computer telemetry signals. The moving histogram technique is described in "Technique for Detecting Changes in Signals that are Measured by Quantization," by inventors Keith A. Whisnant and Kenny C. Gross (U.S. patent application Ser. No. 10/809,721). The spectral synthesis technique is described in "Method and Apparatus for Removing Quantization Effects in a Quantized Signal," by inventors Kenny C. Gross, Ramakrishna C. Dhanekula, Eugenio J. Schuster, and Gregory A. Cumberford (U.S. patent application Ser. No. 11/342,057). The above-listed patent applications are hereby incorporated by reference to provide details on how the moving histogram technique and the spectral synthesis technique can be used to mitigate the effects of quantization in computer telemetry signals.

Unfortunately, both of the above-described preprocessing techniques are computationally costly. Although the preprocessing computations can be performed on the computer system that is being monitored, computer system manufacturers are very reluctant to impose such an overhead on a customer's computer system in exchange for electronic prognostics. One solution to this problem is to preprocess the telemetry signals on a remote computer system. In this type of remote-monitoring technique, low overhead can be maintained on the customer's computer system. Unfortunately, telemetry archival becomes more difficult because the telemetry signals must be preprocessed prior to archival (to make possible intelligent data mining of archival telemetry databases).

Because of the problems described above, telemetry signals are sometimes written straight to archive databases with no preprocessing. These raw, quantized signals are then post processed in an offline manner to generate reports for systems identified to be at risk of failure. These offline reports are generated periodically (e.g., every 24 hours). For offline post-processing analyses, compute cost is no longer an issue. The telemetry signals can be retrieved from the telemetry archive, and a moving histogram technique or a spectral synthesis technique (as described above) can be used for real-time online analyses. However, present techniques to "unquantize" quantized telemetry signals still do not provide a desired sensitivity level for the detection of subtle anomalies and avoidance of false alarms.

Hence, what is needed is a method and an apparatus for mitigating quantization effects in a quantized telemetry system without the problems described above.

SUMMARY

One embodiment of the present invention provides a system that mitigates quantization effects in quantized telemetry signals. During operation, the system monitors a set of quantized telemetry signals. For a given quantized telemetry signal in the set of quantized telemetry signals, the system uses a set of models to generate a set of estimates for the given quantized telemetry signal from the other monitored quantized telemetry signals, wherein each model in the set of models was initialized using a different randomly selected subset of a training dataset. The system then averages the set of estimates to produce an estimated signal for the given quantized telemetry signal.

In a variation on this embodiment, prior to monitoring the quantized telemetry signal, the system receives the training dataset for the quantized telemetry signals. For each quantized telemetry signal to be estimated, the system initializes the set of models for the quantized telemetry signal based on a randomly selected subset of the training dataset.

In a further variation, while initializing a given model, the system applies a non-linear, non-parametric regression technique to a randomly selected subset of the training dataset.

In a further variation, after initializing the given model, the system returns the randomly selected subset of the training dataset to the training dataset so that the randomly selected subset of the training dataset can be reused when generating another model from the quantized telemetry signal.

In a further variation, the non-linear, non-parametric regression technique is a multivariate state estimation technique (MSET).

In a variation on this embodiment, while generating an estimate for the given quantized telemetry signal, the system uses a non-linear, non-parametric regression technique, which involves applying an associated model in the set of models to the other monitored quantized telemetry signals.

In a variation on this embodiment, the system compares one or more estimated signals with corresponding monitored signals to determine whether the computer system is at the onset of degradation. If so, the system performs a remedial action.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1:
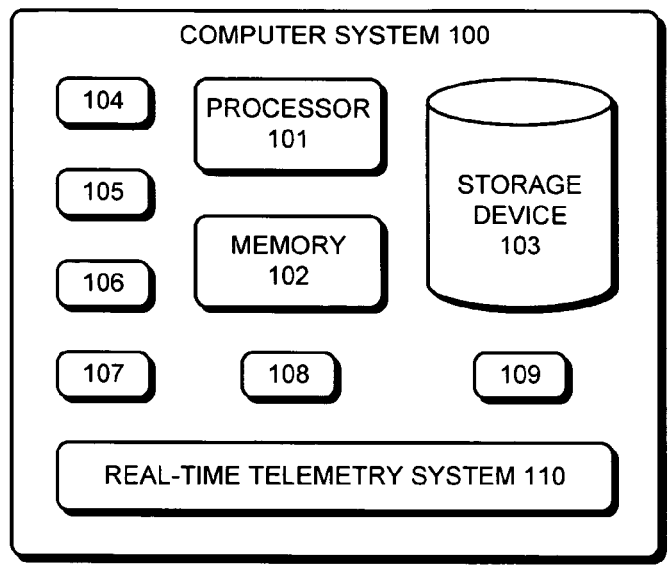
FIG. 1 presents a block diagram of a computer system in accordance with an embodiment of the present invention.

FIG. 1 presents a block diagram of a computer system 100 in accordance with an embodiment of the present invention. Computer system 100 includes processor 101, memory 102, storage device 103, sensors 104-109, and telemetry system 110. In one embodiment of the present invention, sensors 104-109 can include hardware and software sensors.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, and read only memory (ROM). Storage device 103 can include any type of storage device that can be coupled to a computer system, including, but not limited to, magnetic, optical, and magneto optical storage devices, as well as storage devices based on flash memory and/or battery-backed up memory.

Figure 2:
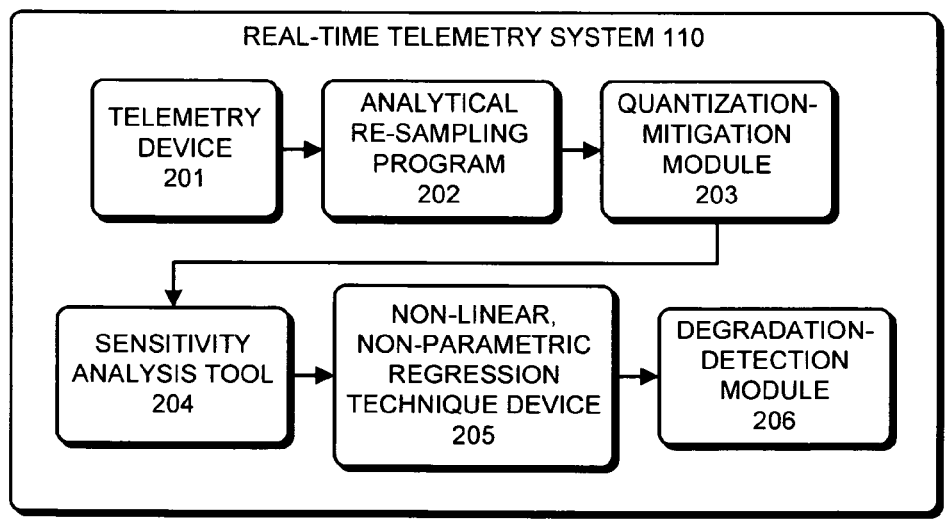
FIG. 2 presents a block diagram of a real-time telemetry system in accordance with an embodiment of the present invention.

FIG. 2 presents a block diagram of real-time telemetry system 110 in accordance with an embodiment of the present invention. Real-time telemetry system 110 includes telemetry device 201, analytical re-sampling program 202, quantization-mitigation module 203, sensitivity analysis tool 204, non-linear, non-parametric regression (NLNP) technique device 205, and degradation-detection module 206. Note that real-time telemetry system 110 is described in more detail below.

Figure 3:
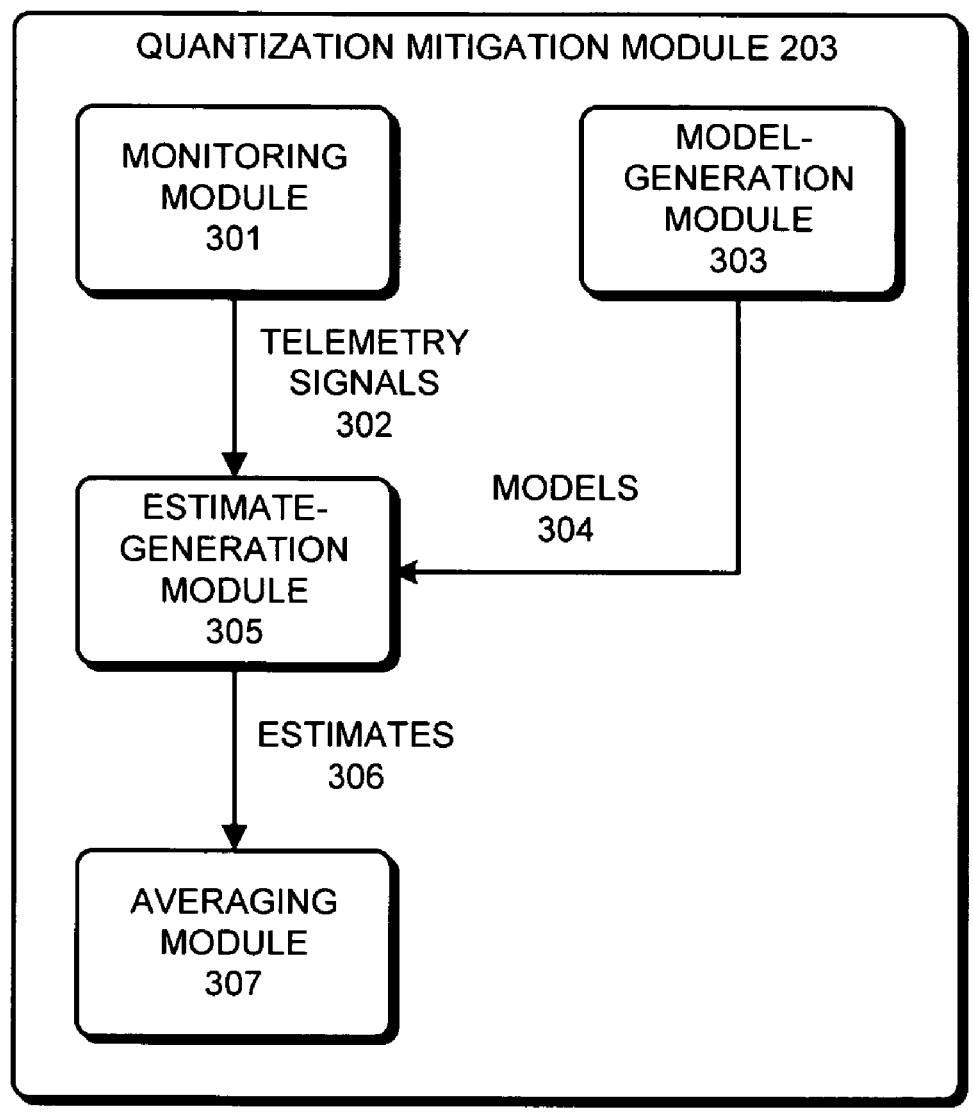
FIG. 3 presents a block diagram of a quantization-mitigation module in accordance with an embodiment of the present invention.

FIG. 3 presents a block diagram of a quantization-mitigation module 203 in accordance with an embodiment of the present invention. Quantization-mitigation module 203 includes monitoring module 301, model-generation module 303, estimate-generation module 305, and averaging module 307. Monitoring module 301 sends telemetry signals 302 received from analytical re-sampling program 202 to estimate-generation module 305. Estimate-generation module 305 uses telemetry signals 302 and a set of models 304 produced by model generation module 303 to generate a set of estimates 306 for telemetry signals 302. Averaging module 307 averages the set of estimates 306 to generate an average signal which can be used by sensitivity analysis tool 204. In one embodiment of the present invention, a set of models is generated for each quantized telemetry signal that is monitored.

Bootstrap Aggregating (Bagging)

One embodiment of the present invention obviates the need for using preprocessing techniques to mitigate the effects of quantization on telemetry signals. In this embodiment, pattern recognition techniques can be applied directly to telemetry signals that have been quantized using low-resolution A/D chips to detect subtle anomalies that can indicate the onset of degradation in a computer system.

Pattern-recognition techniques are typically used to "learn" characteristics or features that are present in a training dataset. The learned characteristics are then used to analyze a test dataset to decide whether the observations are normal or abnormal. Note that for more complex experiments, the pattern-recognition techniques are used to decide whether the observations belong to a given class (e.g., Class A, B, C, etc.). Also note that the training dataset and the test dataset are typically finite in size.

For pattern-recognition problems involving life sciences (e.g., breast cancer detection, diabetes detection, etc.), Leo Breiman was able to demonstrate that for an experiment with a limited amount of training data, if multiple prediction trails are generated by drawing random samples with replacement from a training dataset N times, and the predictions are aggregated and averaged, a substantial gain in prediction accuracy is obtained. (See Leo Breiman, "Bagging Predictors," Technical Report TR421, Statistics Department, University of California at Berkeley, 1994.)

One embodiment of the present invention uses a variation of the bootstrap aggregating ("bagging") technique to mitigate the effects of quantization in telemetry signals generated by low-resolution A/D chips. This embodiment collects a finite training dataset of telemetry signals from a computer system that is deemed to be not degraded. For each iteration of the pattern recognition technique, random observations are selected, with replacement, from the finite training dataset. Over N iterations, this produces N pattern recognition predictions for each telemetry signal under surveillance. The N predictions are aggregated and are averaged to produce the "bagged predictor." Experiments have demonstrated that this technique produces substantially better predictions (i.e., 50-60% improvement) as compared to using raw, quantized telemetry signals that were generated by 8-Bit A/D chips within legacy computer systems.

The bagging technique used by the present invention operates as follows. Consider a training dataset that includes m quantized telemetry signals $S_1 \ldots S_m$. For each telemetry signal, the following steps are performed.

Step 1

The number of predictor replicates to be evaluated is set to n. A number of observation vectors, x, are picked from training data at random. In one embodiment of the present invention, x is set nominally at 5% of the total number of observation present in the training dataset.

Step 2

Models $M_1 \ldots M_n$ are initialized by replacing the x vectors selected from the training dataset with a new set of randomly-selected vectors so that during the initialization of each predictor replicate, the training data set is different. Note that after generating each predictor replicate, the selected vectors are put back into the training dataset so that they can be reused to generate another predictor replicate.

Step 3

The predictor replicates $M_1 \ldots M_n$ are used in the monitoring phase on the test data. Estimates $E_1 \ldots E_n$ are calculated for the test data, respectively. The estimates corresponding to the signal $S_i$ are collected from all the estimates' data structures $E_1 \ldots E_n$ and averaged across these n aggregates. This averaged estimate of the signal $S_i$ is then used to calculate the residual function.

Figure 4:
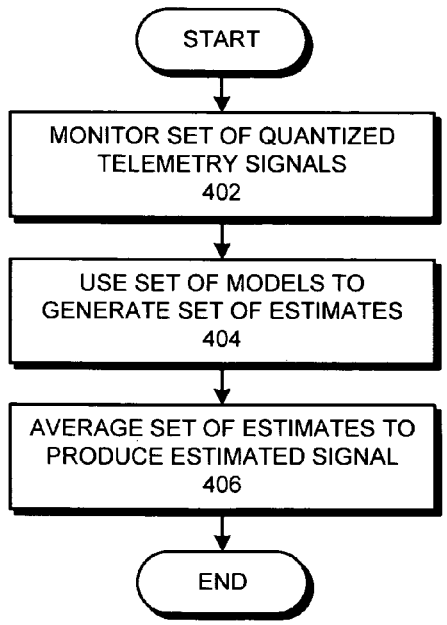
FIG. 4 presents a flow chart illustrating the process of mitigating quantization effects in quantized telemetry signals in accordance with an embodiment of the present invention.
Figure 5:
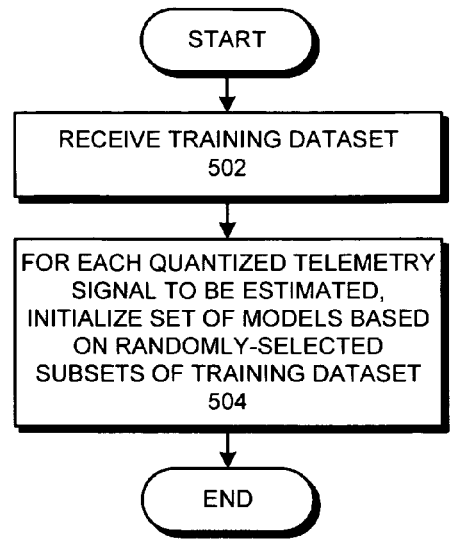
FIG. 5 presents a flow chart illustrating the process of initializing a set of models in accordance with an embodiment of the present invention.
Figure 6:
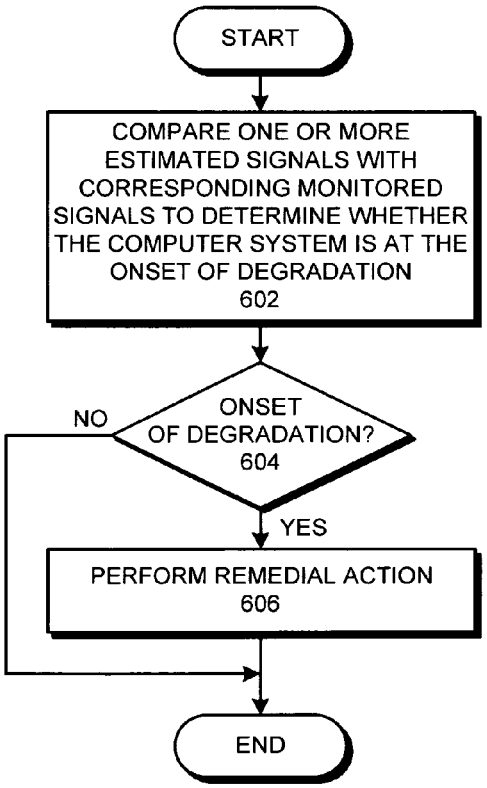
FIG. 6 presents a flow chart illustrating the process of determining whether a computer system is at the onset of degradation in accordance with an embodiment of the present invention.

FIGS. 4-6 summarize the above-described process. More specifically, FIG. 4 presents a flow chart illustrating the process of mitigating quantization effects in quantized telemetry signals in accordance with an embodiment of the present invention. The process begins when the system monitors a set of quantized telemetry signals (step 402). For a given quantized telemetry signal in the set of quantized telemetry signals, the system uses a set of models to generate a set of estimates for the given quantized telemetry signal from the other monitored quantized telemetry signals, wherein each model in the set of models was initialized using a different randomly-selected subset of a training dataset (step 404). The system then averages the set of estimates to produce an estimated signal for the given quantized telemetry signal (step 406).

In one embodiment of the present invention, while generating an estimate for the given quantized telemetry signal, the system uses a non-linear, non-parametric regression technique. In one embodiment of the present invention, the non-linear, non-parametric regression technique is a multivariate state estimation technique (MSET).

FIG. 5 presents a flow chart illustrating the process of initializing a set of models in accordance with an embodiment of the present invention. The process begins when the system receives the training dataset for the quantized telemetry signals (step 502). For each quantized telemetry signal to be estimated, the system initializes the set of models for the quantized telemetry signal based on a randomly-selected subset of the training dataset (step 504). In one embodiment of the present invention, while initializing a given model, the system applies a non-linear, non-parametric regression technique to a randomly-selected subset of the training dataset.

In one embodiment of the present invention, after initializing the given model, the system returns the randomly-selected subset of the training dataset to the training dataset so that the randomly-selected subset of the training dataset can be reused when generating another model from the quantized telemetry signal.

FIG. 6 presents a flow chart illustrating the process of determining whether a computer system is at the onset of degradation in accordance with an embodiment of the present invention. Note that this process uses degradation-detection module 206 which is described with reference to FIG. 2. The process begins when the system compares one or more estimated signals with corresponding monitored signals to determine whether the computer system is at the onset of degradation (step 602). If so (step 604—yes), the system performs a remedial action (step 606). In one embodiment of the present invention, the remedial action can involve generating a notification for a system administrator, halting the computer system, failing-over to a backup computer system, or replacing the computer system.

Real-Time Telemetry System

We now describe the real-time telemetry system 110 illustrated in FIG. 2 in more detail. Referring to FIG. 2, telemetry device 201 gathers information from the various sensors and monitoring tools within computer system 100, and directs the signals to local or remote locations that contain analytical re-sampling program 202, quantization-mitigation module 203, sensitivity analysis tool 204, NLNP regression technique device 205, and degradation-detection module 206. In one embodiment of the present invention, analytical re-sampling program 202, quantization-mitigation module 203, sensitivity analysis tool 204, NLNP regression technique device 205, and degradation-detection module 206 are located within computer system 100. In another embodiment, they are distributed across a plurality of computer systems including computer system 100 and other remote computer systems.

The analytical re-sampling program 202 ensures that the signals have a uniform sampling rate. In doing so, analytical re-sampling program 202 uses interpolation techniques, if necessary, to fill in missing data points, or to equalize the sampling intervals when the raw data is non-uniformly sampled.

After the signals pass through analytical re-sampling program 202, quantization-mitigation module 203 mitigates the effects of quantization on the telemetry signals. The estimated signals produced by quantization-mitigation module 203 are aligned and correlated by sensitivity analysis tool 204. For example, in one embodiment of the present invention, sensitivity analysis tool 204 incorporates a novel moving window technique that "slides" through the signals with systematically varying window widths. The sliding windows systematically vary the alignment between windows for different signals to optimize the degree of association between the signals, as quantified by an "F-statistic," which is computed and ranked for all signal windows by sensitivity analysis tool 204.

For statistically comparing the quality of two fits, F-statistics reveal the measure of regression. The higher the value of the F-statistic, the better the correlation is between two signals. The lead/lag value for the sliding window that results in the F-statistic with the highest value is chosen, and the candidate signal is aligned to maximize this value. This process is repeated for each signal by sensitivity analysis tool 204.

Signals that have an F-statistic very close to 1 are "completely correlated" and can be discarded. This can result when two signals are measuring the same metric, but are expressing them in different engineering units. For example, a signal can convey a temperature in degrees Fahrenheit, while a second signal conveys the same temperature in degrees Centigrade. Since these two signals are perfectly correlated, one does not contain any additional information over the other, and therefore, one may be discarded.

Some signals may exhibit little correlation, or no correlation whatsoever. In this case, these signals may be dropped as they add little predictive value. Once a highly correlated subset of the signals has been determined, they are combined into one group or cluster for processing by the NLNP regression technique device 404.

Non-Linear, Non-Parametric Regression

In one embodiment of the present invention, the NLNP regression technique which is used by the present invention is a multivariate state estimation technique (MSET). The term "MSET" as used in this specification refers to a class of pattern recognition algorithms. For example, see [Gribok]

"Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington DC, Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

One embodiment of the present invention uses an advanced pattern recognition approach, which takes data gathered from software variables reported by the operating system, hardware variables generated by the sensors in the computer system, and a model of a properly-functioning computer system which is generated during a training phase, to determine whether a computer system is at the onset of degradation.

Hence, one embodiment of the present invention continuously monitors a variety of instrumentation signals in real time during operation of the computer system. (Note that although we refer to a single computer system in this disclosure, the present invention also applies to a collection of computer systems).

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

These instrumentation signals can additionally include hardware variables, including, but not limited to, internal temperatures, voltages, currents, and fan speeds.

Furthermore, these instrumentation signals can include disk-related metrics for a remote storage device, including, but not limited to, average service time, average response time, number of kilobytes (kB) read per second, number of kB written per second, number of read requests per second, number of write requests per second, and number of soft errors per second.

The foregoing instrumentation parameters are monitored continuously with an advanced statistical pattern recognition technique. One embodiment of the present invention uses a class of techniques known as non-linear, non-parametric (NLNP) regression techniques, such as the MSET. Alternatively, the present invention can use other pattern recognition techniques, such as neural networks or other types of NLNP regression. Another embodiment of the present invention uses a linear regression technique. In each case, the pattern recognition module "learns" how the behavior of the monitored variables relates to a properly-functioning computer system. The pattern recognition module then generates a model of the properly-functioning computer system that is used to determine whether a computer system is at the onset of degradation.

In one embodiment of the present invention, the system components from which the instrumentation signals originate are field replaceable units (FRUs), which can be independently monitored. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for mitigating quantization effects in quantized telemetry signals, comprising:
   monitoring a set of quantized telemetry signals;
   for a given quantized telemetry signal in the set of quantized telemetry signals,
       using a set of models to generate a set of estimates for the given quantized telemetry signal from the other monitored quantized telemetry signals, wherein each model in the set of models was initialized using a different randomly-selected subset of a training dataset, wherein the training dataset includes monitored telemetry signals from a computer system that is not degraded; and
       averaging the set of estimates to produce an estimated signal for the given quantized telemetry signal.

2. The method of claim 1, wherein prior to monitoring the set of quantized telemetry signals, the method further comprises:
   receiving the training dataset for the set of quantized telemetry signals; and
   for each quantized telemetry signal to be estimated, initializing the set of models for the quantized telemetry signal to be estimated based on a randomly-selected subset of the training dataset.

3. The method of claim 2, wherein initializing a given model involves applying a non-linear, non-parametric regression technique to a randomly-selected subset of the training dataset.

4. The method of claim 3, wherein after initializing the given model, the method further comprises returning the randomly-selected subset of the training dataset to the training dataset so that the randomly-selected subset of the training dataset can be reused when generating another model from the quantized telemetry signal.

5. The method of claim 3, wherein the non-linear, non-parametric regression technique is a multivariate state estimation technique (MSET).

6. The method of claim 1, wherein generating an estimate for the given quantized telemetry signal involves using a non-linear, non-parametric regression technique, which involves applying an associated model in the set of models to the other monitored quantized telemetry signals.

7. The method of claim 1, wherein the method further comprises:

comparing one or more estimated signals with corresponding monitored signals to determine whether a second computer system is at the onset of degradation; and if so, performing a remedial action.

8. A computer-readable storage medium storing instructions that when executed by a computer cause the computer to perform a method for mitigating quantization effects in quantized telemetry signals, wherein the method comprises:

monitoring a set of quantized telemetry signals;

for a given quantized telemetry signal in the set of quantized telemetry signals, using a set of models to generate a set of estimates for the given quantized telemetry signal from the other monitored quantized telemetry signals, wherein each model in the set of models was initialized using a different randomly-selected subset of a training dataset, wherein the training dataset includes monitored telemetry signals from a computer system that is not degraded; and averaging the set of estimates to produce an estimated signal for the given quantized telemetry signal.

9. The computer-readable storage medium of claim 8, wherein prior to monitoring the set of quantized telemetry signals, the method further comprises:

receiving the training dataset for the set of quantized telemetry signals; and for each quantized telemetry signal to be estimated, initializing the set of models for the quantized telemetry signal to be estimated based on a randomly-selected subset of the training dataset.

10. The computer-readable storage medium of claim 9, wherein initializing a given model involves applying a non-linear, non-parametric regression technique to a randomly-selected subset of the training dataset.

11. The computer-readable storage medium of claim 10, wherein after initializing the given model, the method further comprises returning the randomly-selected subset of the training dataset to the training dataset so that the randomly-selected subset of the training dataset can be reused when generating another model from the quantized telemetry signal.

12. The computer-readable storage medium of claim 10, wherein the non-linear, non-parametric regression technique is a multivariate state estimation technique (MSET).

13. The computer-readable storage medium of claim 8, wherein generating an estimate for the given quantized telemetry signal involves using a non-linear, non-parametric regression technique, which involves applying an associated model in the set of models to the other monitored quantized telemetry signals.

14. The computer-readable storage medium of claim 8, wherein the method further comprises:

comparing one or more estimated signals with corresponding monitored signals to determine whether a second computer system is at the onset of degradation; and if so, performing a remedial action.

15. An apparatus that mitigates quantization effects in quantized telemetry signals, comprising:

a processor;

memory coupled to the processor;

a monitoring mechanism configured to monitor a set of quantized telemetry signals;

an estimate-generation mechanism, wherein for a given quantized telemetry signal in the set of quantized telemetry signals, the estimate-generation mechanism is configured to use a set of models to generate a set of estimates for the given quantized telemetry signal from the other monitored quantized telemetry signals, wherein each model in the set of models was initialized using a different randomly selected subset of a training dataset, wherein the training dataset includes monitored telemetry signals from a computer system that is not degraded; and an averaging mechanism configured to average the set of estimates to produce an estimated signal for the given quantized telemetry signal.

16. The apparatus of claim 15, further comprising a model-generation mechanism, wherein prior to monitoring the set of quantized telemetry signals, the model-generation mechanism is configured to:

receive the training dataset for the set of quantized telemetry signals; and for each quantized telemetry signal to be estimated, to initialize the set of models for the quantized telemetry signal to be estimated based on a randomly-selected subset of the training dataset.

17. The apparatus of claim 16, wherein while initializing a given model, the model-generation mechanism is configured to apply a non-linear, non-parametric regression technique to a randomly-selected subset of the training dataset.

18. The apparatus of claim 17, wherein after initializing the given model, the model-generation mechanism is configured to return the randomly-selected subset of the training dataset to the training dataset so that the randomly-selected subset of the training dataset can be reused when generating another model from the quantized telemetry signal.

19. The apparatus of claim 17, wherein the non-linear, non-parametric regression technique is a multivariate state estimation technique (MSET).

20. The apparatus of claim 15, wherein while generating an estimate for the given quantized telemetry signal, the estimate-generation mechanism is configured to use a non-linear, non-parametric regression technique, which involves applying an associated model in the set of models to the other monitored quantized telemetry signals.

21. The apparatus of claim 15, further comprising a degradation-detection mechanism, wherein the degradation-detection mechanism is configured to:

compare one or more estimated signals with corresponding monitored signals to determine whether a second computer system is at the onset of degradation; and if so, to perform a remedial action.

* * * * *